United States Patent [19]

Hives

[11] 4,025,216
[45] May 24, 1977

[54] KNOCKDOWN INTERLOCKING CONNECTORS

[75] Inventor: Ronald Hives, St. Helens, England

[73] Assignee: Newage Kitchens Limited, Liverpool, England

[22] Filed: Mar. 18, 1976

[21] Appl. No.: 668,118

[30] Foreign Application Priority Data

Mar. 19, 1975 United Kingdom ............ 11344/75

[52] U.S. Cl. .............................. 403/381; 403/407
[51] Int. Cl.² ......................................... B25G 3/08
[58] Field of Search ............ 52/754, 753 C, 753 D; 403/331, 329, 326, 243, 381, 407

[56] References Cited

UNITED STATES PATENTS

| | | |
|---|---|---|
| 3,255,721 | 1/1964 | Peterschmidt ................. 403/329 X |
| 3,856,246 | 12/1974 | Sinko ............................. 403/331 X |
| 3,914,061 | 10/1975 | Meyer ........................... 403/243 X |

Primary Examiner—Wayne L. Shedd
Attorney, Agent, or Firm—Geoffrey R. Myers

[57] ABSTRACT

The invention relates to a knock-down fitting which comprises a pair of interlockable elements adapted to be secured to respective walls of an item of furniture for maintaining said walls in fixed relation to one another when the elements are interlocked. The elements have cooperable means interengageable in a snap-fitting manner to secure the elements together substantially without play.

1 Claim, 6 Drawing Figures

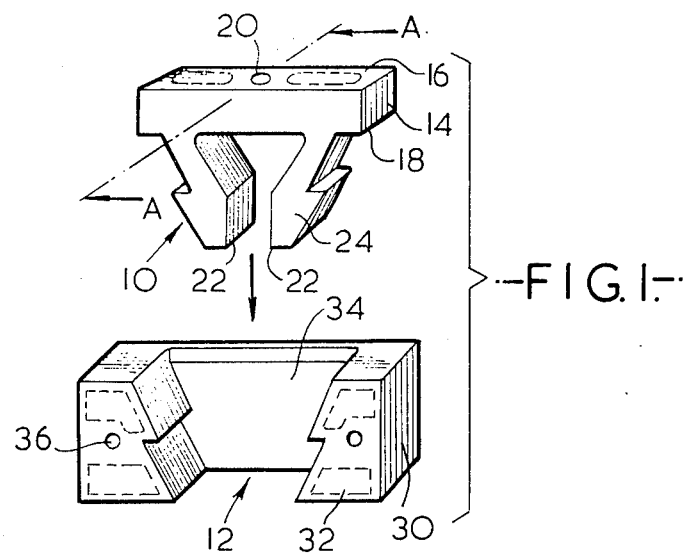
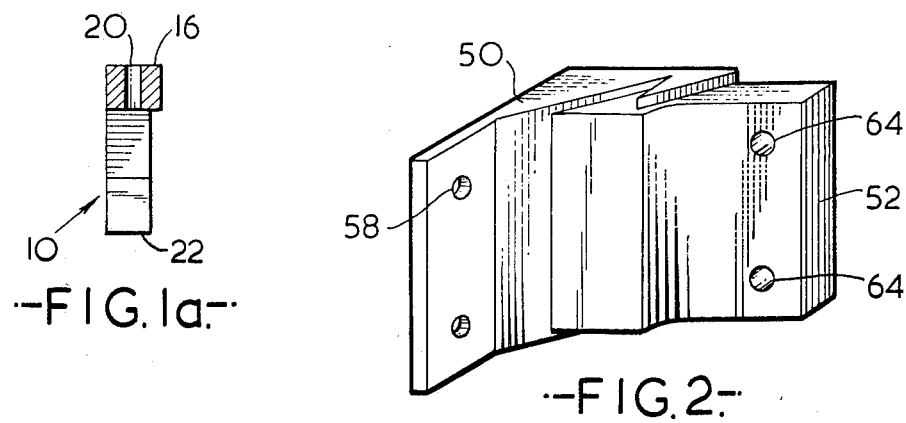
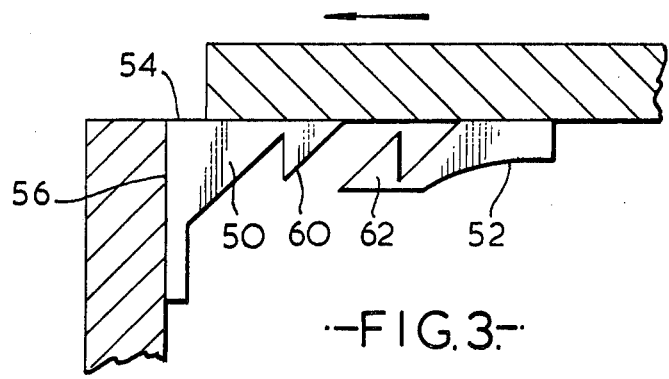

KNOCKDOWN INTERLOCKING CONNECTORS

The present invention relates to knock down fittings for use in items of furniture. In particular, the invention provides fittings which enable kitchen units and the like cabinets to be quickly assembled either in the factory or, in the case where the unit is supplied in kit form, by the buyer.

Known corner fittings which are used in the construction of items of furniture such as cabinets to join adjacent side walls thereof are either integral with the side walls e.g. as projections on one member which are glued or pinned in recesses in the other member (dovetail joints) or in the form of brackets which have to be secured to the side walls generally by gluing or with screw or bolts.

Such known corner fittings are disadvantageous in that the jointing of two side walls with the corner fittings requires a considerable number of operations e.g. in cutting dovetail joints or drilling holes for the screws or bolts for a bracket. In addition, unless glued such joints tend to work loose in time and as will be appreciated gluing the joints generally requires that the side walls be clamped together until the glue has set, thus considerably increasing assembly time.

Furthermore, such jointing techniques are applicable only to factory assembled furniture and are not suitable for kits intended to be assembled by the purchaser.

An object of the invention is to provide a corner fitting which overcomes the above disadvantages.

According to the present invention, a knock down fitting comprises a pair of interlocking elements which are adapted to be secured to respective walls of an item of furniture for maintaining the walls in fixed relation to one another when the elements are interlocked, the elements having cooperable means interengageable in a snap-fitting manner to secure the elements together substantially without play.

The advantage of corner fittings according to the present invention lies in the simple snap-fitting manner in which the elements engage, pinning or gluing not being required.

The invention will be described further, by way of example, with reference to the drawings, in which:

FIG. 1 is a perspective exploded view of a first embodiment of the invention;

FIG. 1a is a section on the line A—A of FIG. 1;

FIG. 2 is a perspective assembled view of a second embodiment of the invention;

FIG. 3 is a plan view showing a pair of walls being assembled by means of the embodiment of FIG. 2;

Figure 4:
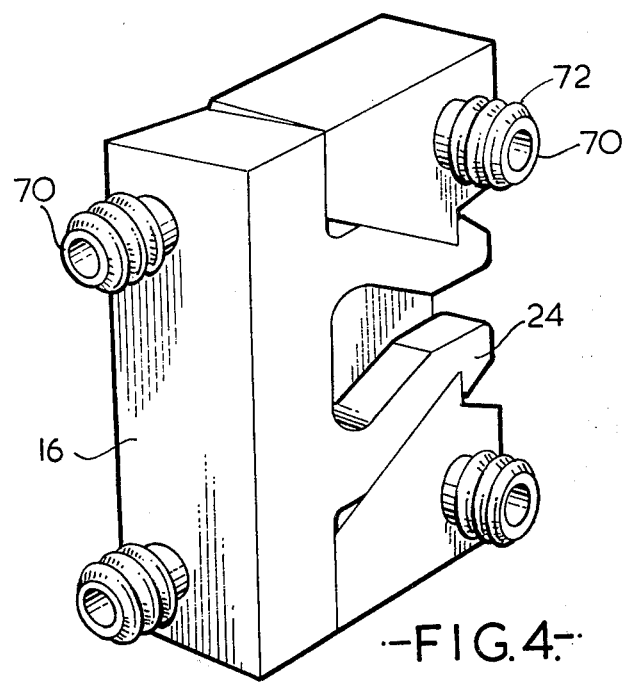
Figure 5:
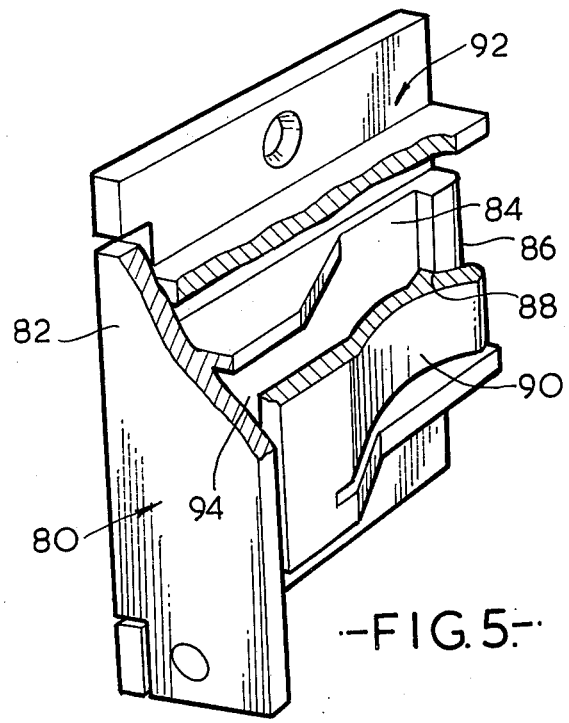

FIG. 4 is a perspective view of a third embodiment of the invention, partially broken away; and FIG. 5 is a perspective view of a fourth embodiment of the invention, also partially broken away, FIG. 1 illustrates a knock down fitting which comprises two elements generally designated 10 and 12 respectively. The element 10 comprises a plate 14 having an upper surface 16 and a lower surface 18, the element 10 is intended to be secured to an inner surface of a wall of a kitchen cabinet or other item of panel constructed furniture (not shown) adjacent an edge of the wall, with the surface 16 in contact with the wall. A hole 20 is provided in the plate 14 to enable the element 10 to be screwed or bolted to the wall of the cabinet, or secured by moulded pegs.

From the face 18 of the element 10 there projects a pair of legs 22 each of which has a barb-like projection 24. The element 10 is made of a resiliently deformable material, such as high density nylon so that the legs 22 may be flexed towards and away from one another.

The other element 12 comprises a plate 30 having a face 32 in which there is formed a channel 34 having the same depth as the width of the legs 22 of the element 10. The element 12 is intended to be secured adjacent an edge of another wall of the kitchen cabinet or other item of panel constructed furniture with the surface 32 thereof in contact with the inner surface of the wall. Again, the element 12 is provided with holes 36 for receiving screws or bolts by means of which the element may be secured to the wall of the unit.

The side walls of the channel 34 are stepped as illustrated to provide shoulders or steps which cooperate with the barb-like projections 24 as hereinafter described.

The walls of the units can be assembled with their two aforementioned edges adjacent by first screwing the elements 12 and 10 to be respective walls. The walls can then be assembled by introducing the legs 22 into the channel 34 in the direction of the arrow of FIG. 1. The outer surfaces of the legs 22 slide over the side walls of the channel 34 at the same time flexing inwards. The corresponding positions of the barb-like projections 24 and the steps of the side walls, and the separation of the legs 22 are such that when the barb-like projections 24 clear the steps in the side walls of the channel 34, the legs 22 reside, engaging the barb-like projections 24 with the steps to firmly engage the two elements together substantially without play and prevent movement between the two walls of the unit. It is thus seen that the fitting operates in a manner analogous to a pawl and ratchet with the barb-like portion 24 serving as a resiliently deformable pawl and the stepped side wall of the channel 34 serving as the ratchet.

The elements 10, 12 may be cored out as shown in dotted lines to reduce the quantity of material used per element. Alternatively the channel 34 is resiliently displaceable to accommodate the element 10.

The second embodiment of the invention, shown in FIGS. 2 and 3, also comprises a pair of elements designated 50 and 52. The element 50 has two mutually perpendicular faces 54 and 56, the face 56 being intended to contact the inner surface of one of a pair of walls to be secured to one another. Holes 58 in the wall 56 are intended to receive screws or bolts or to incorporate moulded pegs for mounting this element on the wall. When mounted the face 54 lies flush (see FIG. 3) with the edge of the wall of the cabinet. The element 50 further comprises a barb-like projection 60 extending in a direction parallel to the wall to which it is intended to be fitted from its end remote from the latter wall.

The other element 52 is provided with a hole 64 by means of which it may be secured to the other of the two walls. Its end nearest the element 50 has a barb-like projection 62 which may be resiliently deflected away from the wall to which element 52 is secured. The walls are assembled by sliding them relative to one another in the direction of the arrow shown in FIG. 3 after the elements 50 and 52 have been secured to the respective walls. During the sliding movement the projection 62 is flexed from the wall to which the elements 52 is secured and slides over a slanting wall 64 of the element 50. When the two walls have moved sufficiently relative to one another the bar 62 snaps back into position by virtue of its own elasticity and prevents further movement of the two walls.

FIG. 4 is a perspective view of a third embodiment similar to that of FIGS. 1 to 2 with like parts numbered the same.

Studs 70 are optionally provided on the two elements, preferably moulded integral therewith, to enable the elements to be secured to the respective walls by inserting the studs into previously drilled holes of a slightly smaller diameter than the studs. The studs are shown having annular barbs 72 which deform on insertion of the plugs into the holes and firmly secure the elements in position.

The embodiments of FIGS. 1 to 3 can also be provided with studs 70.

The embodiment of FIG. 5 has an element 80 which has a plate 82 from which a tongue 84 projects. The free end of the tongue 84 is formed with a hook 86 which snap engages with an edge 88 of a tongue 90 in a socket element 92. Either the tongue 90 or the tongue 84 or both are resilient to provide the snap engagement. The hook 86 is spaced from the plate 82 the same distance as the edge 88 is from the mouth 94 of the socket member to ensure a secure engagement of the two elements.

The embodiment of FIG. 5 functions in a similar manner to that of FIGS. 1 to 2 and can optionally be provided with studs 70.

All the elements of the described embodiments are preferably made of a resiliently deformable material such as high density nylon.

It will be understood that though the invention has been described with reference to fittings intended to maintain walls in mutually perpendicular plane this is not an essential feature of the invention since the walls may if required be fixed in planes bearing obtuse or acute angles to one another.

What I claim:

1. A knockdown fitting for securely connecting elements of a piece of furniture together, said fitting comprising a pair of interlocking male and female members and means for securing these members to respective elements of said furniture, said male member being comprised of a laterally extending platform defined by a first distal surface and a first proximal surface, and a pair of spaced resilient projections extending in a longitudinal inwardly converging direction generally perpendicular to said first proximate surface from a location intermediate the ends of said first proximal surface, said projections being flexible and including intermediate their ends an outwardly extending barb having a second proximal surface thereby defining an inwardly extending cavity between the first proximal surface of said platform and second proximal surface of said barbs and wherein said projections each terminate in a respective second distal surface, said female member being comprised of a block means having a third proximal laterally extending surface and a third distal surface and, intermediate the ends of said third proximal surface, an inwardly converging channel extending longitudinally from the third proximal surface through the third distal surface in a generally perpendicular direction to the third proximal and third distal surfaces, said channel being provided at a location intermediate its ends and on adjacent sides thereof, with a pair of opposing outwardly extending steps having a fourth proximal surface thereby defining a spaced inwardly protrusion between the third proximal and fourth proximal surfaces, said inwardly extending protrusion being of a similar configuration as the cavity of the male member but of slightly less longitudinal dimension, the lateral width from barb to barb being greater than the lateral width from step to step such that upon insertion of the projections of the male member into the channel of the female member said barbs snap fit onto said steps thereby to retain said protrusion securely within said cavity, retain said first proximal surface in contact with said third proximal surface and retain the second proximal surface in contact with the fourth proximal surface and whereby when said male member is fit into said female member there is open access to the second distal surface sufficient to allow the projections to be inwardly flexed for removal of the male member from the female member.

* * * * *